United States Patent [19]
Sawai et al.

[11] Patent Number: 6,155,685
[45] Date of Patent: *Dec. 5, 2000

[54] PROJECTOR

[75] Inventors: Yasumasa Sawai, Sakai; Nobuo Mushiake, Osaka; Hakuzo Tani, Takatsuki, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/958,826

[22] Filed: Oct. 28, 1997

[30] Foreign Application Priority Data

Oct. 31, 1996 [JP] Japan .................................... 8-290844
Oct. 31, 1996 [JP] Japan .................................... 8-290845

[51] Int. Cl.⁷ ............................. G03B 21/26; G03B 21/00
[52] U.S. Cl. ................................. 353/30; 353/31; 353/33
[58] Field of Search ................................. 353/30, 31, 33, 353/34, 37, 81, 69; 349/8, 9; 359/833, 834, 836, 837

[56] References Cited

U.S. PATENT DOCUMENTS 5,097,323  3/1992  Sato et al. .................................. 358/60
5,105,265  4/1992  Sato et al. .................................. 358/60

FOREIGN PATENT DOCUMENTS

| 2-163729 | 6/1990 | Japan . |
| 4-78816 | 3/1992 | Japan . |
| 4-139416 | 5/1992 | Japan . |
| 4-223456 | 8/1992 | Japan . |
| 5-80290 | 4/1993 | Japan . |
| 5-313120 | 11/1993 | Japan . |
| 7-175029 | 7/1995 | Japan . |

*Primary Examiner*—David M. Gray
*Assistant Examiner*—Hung Henry Nguyen
*Attorney, Agent, or Firm*—Sidley & Austin

[57] ABSTRACT

An optical device includes four prisms joined into one body to combine light beams, a first type of multilayer coating being provided between joining surfaces of the four prisms, and a second type of multilayer coating being provided on at least one non-joining surface of the four right-angle prisms. Each prism bears the first type of multilayer coating and the second type of multilayer coating on two or less surfaces thereof. The optical device is further provided with liquid crystal image panels to combine optical images and project a combined optical image to a screen.

12 Claims, 7 Drawing Sheets

PROJECTOR

BACKGROUND OF THE INVENTION

This invention relates to a projector for projecting an enlarged optical image on a screen.

As a device for displaying a large image, there has been known a projector which generates an optical image in accordance with a video signal by illumination light and projecting the enlarged optical image of illumination light on a screen by means of a projection lens.

Such a projector will be briefly described with reference to FIG. 8 showing its construction. Beams transmitted from an illuminating optical system 51 are split into beams in three wavelength regions of R (Red), G (Green) and B (Blue) by dichroic mirrors 52, 53. Specifically, the beams in the wavelength region of R reflected by the dichroic mirror 52 are reflected by a full-reflection mirror 54, and illuminate a liquid crystal panel 56 after passing a field lens 55. The beams in the wavelength regions of G-and B pass the dichroic mirror 52. The beams in the wavelength region of G are reflected by the dichroic mirror 53, and illuminate a liquid crystal panel 58 after passing a field lens 57. The beams in the wavelength region of B pass the dichroic mirror 53, and are introduced to a relay optical system constructed by two lenses 59, 60 and two full-reflection mirrors 61, 62. Thereafter, these beams illuminate a liquid crystal panel 64 after passing a field lens 63.

Optical images formed by the respective three liquid crystal panels 56, 58, 64 are combined by a dichroic prism 65. Specifically, the optical image of R formed by the liquid crystal panel 56 is propagated straight in the dichroic prism 65 as an incident light, is reflected at 90° by a first dichroic mirror portion 65a after having been incident thereon at 45°, and emerges toward a projection lens 66. The optical image of B also is propagated straight in the dichroic prism 65 as an incident light, is reflected at 90° by a second dichroic mirror portion 65b after having been incident thereon at 45°, and emerges toward the projection lens 66. The optical image of G formed by the liquid crystal panel 58 is propagated straight all through the dichroic mirror 65 as an incident light without being reflected by the first and second dichroic mirror portions 65a, 65b, and emerges toward the projection lens 66.

In this way, the optical images formed by the respective three liquid crystal panels 56, 58, 64 are combined by being projected toward the projection lens 66 located in the same direction while the axes of polarization of the optical images are coincided with an optic axis. The thus combined optical image is projected as an enlarged image on the screen via the projection lens 66.

However, if an optical integrator is used in the illuminating optical system 51 of the above prior art projector in order to make the illumination as bright as possible and to illuminate the image surfaces of the respective liquid crystal panels with a more uniform illuminance, the angle of incidence on each dichroic mirror varies to a greater degree than in the projector in which no optical integrator is used. This results in a larger degree of chromaticity nonuniformity of the image projected on the screen.

Specifically, if the optical integrator is used, an incidence angle of the beam on the dichroic mirror has a range of ±20° with respect to a center value of 45°. Even if the beams are incident on the dichroic mirror at an incidence angle of 25 to 65°, it does not cause any problem unless a cutoff value of the dichroic mirror for target wavelengths varies. However, in reality, such a variation is unavoidable. In FIG. 8, for example, in the case of the beams in the wavelength region of G, the chromaticity (Yxy value) of the green beams illuminating the liquid crystal panel 58 varies at a left point P1 and a right point P2 of the liquid crystal panel 58 (see FIG. 10) due to an incidence angle dependency of the dichroic mirror 53 (see FIG. 9). Thus, the image having its chromaticity varied by the projection lens 66 is projected on the screen as it is, disadvantageously causing a color unevenness.

In order to correct this color unevenness, it is necessary to provide, for example, a dichroic mirror for a color correction purpose at an incidence side of the dichroic prism 65.. In this case, the number of parts is increased.

SUMMARY OF THE INVENTION

It is an object of the present invention to provide a projector which has overcome the problems residing in the prior art.

According to an aspect of the present invention, a projector comprises: an illuminating optical system which produces illumination light; a spectral optical system which splits the illumination light into beams of three primary colors; an optical image forming unit which forms respective optical images of the three primary colors; and an optical image combining unit which combines the respective optical images of the three primary colors to produce a color optical image, the optical image combining unit including first to fourth prisms each having three plane surfaces, and being joined into one body in the form of a rectangular parallelepiped, the first to third prisms having incidence surfaces for the beams of the three primary colors, respectively, the fourth prism having an emergence surface for the beams of the three primary colors, one inner plane surface of the first prism and one inner plane surface of the second prism being provided with dichroic mirror layers respectively, and at least one of the first to third prisms being provided with a color correction layer on its incidence surface.

According to another aspect of the present invention, an optical device comprises: a prism assembly including four right-angle prisms joined at their respective right angles to combine light beams; a first type of multilayer coating being provided between joining surfaces of the four right-angle prisms; and a second type of multilayer coating being provided on at least one non-joining surface of the four right-angle prisms; each prism bearing the first type of multilayer coating and the second type of multilayer coating on two or less surfaces thereof.

According to still another aspect of the present invention, further, an optical device comprises: a prism assembly including four roof prisms joined to their respective roofs to combine light beams; a first type of multilayer coating being provided between joining surfaces of the four roof prisms; and a second type of multilayer coating being provided on at least one non-joining surface of the four roof prisms; each prism bearing the first type of multilayer coating and the second type of multilayer coating on two or less surfaces thereof.

According to yet still another aspect of the present invention, moreover, a projector comprises: an illuminating optical system which produces illumination light; a spectral optical system which splits the illumination light into beams of the three primary colors, the spectral optical system including a first dichroic mirror operable to reflect beams of blue and pass beams of green and red, and a second dichroic mirror disposed in a propagation direction of illumination light and operable to reflect beams of green and pass beams of red; an optical image forming unit which forms respective optical images of the three primary colors; and an optical image combining unit which combines the respective optical images of the three primary colors to produce a color optical image.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
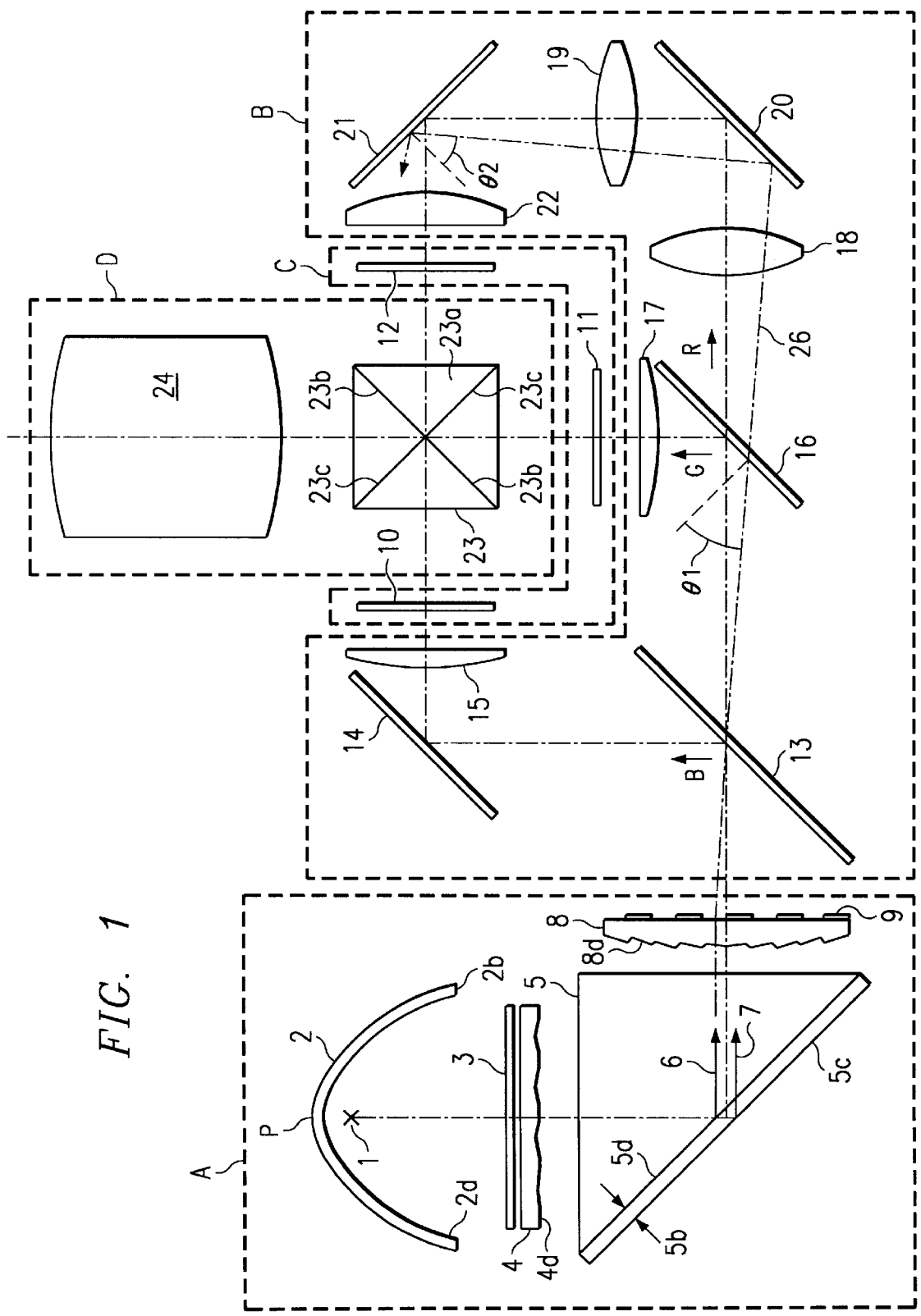
FIG. 1 is a diagram showing a construction of a first projector embodying the invention.

Referring now to FIG. 1, a first projector of the invention includes an illuminating optical system A provided with an optical integrator, a spectral optical system B, an optical image forming unit C, and an optical image combining/enlarging unit D.

The spectral optical system B splits illumination light from the illuminating optical system A into beams of three primary colors of R, G and B. The optical image forming unit C forms optical images of three primary colors using the beams from the spectral optical system B.

The optical image combining/enlarging unit D combines the respective optical images of three primary colors formed by the optical image forming unit C to produce a color optical image and projects an enlarged image on an unillustrated screen.

The illuminating optical system A includes a light source 1, a parabolic reflector 2, an IR-UV filter 3, a first lens array 4, a polarized beam splitter 5, a second lens array 8 and half-wave plates 9.

The light source 1 is a metal halide lamp for radiating a randomly polarized white light. The parabolic mirror 2 has a reflection surface 2a which is a partial surface including a pole of a paraboloid of revolution and has a cross section which is symmetrical with respect to a line. The parabolic mirror 2 is adapted to reflect light irradiated from a focus (the light source 1 is located in this focus position) to the outside (downward in FIG. 1) of an opening 2b. An IR-UV filter 3 is arranged in the vicinity of the opening 2b and is adapted to remove light components within wavelength regions unnecessary for lights of three primary colors from the direct light from the light source 1 and the light reflected by the reflection surface 2a.

A first lens array 4 constituting the optical integrator includes a plurality of two-dimensionally arranged first lenses 4a on which the direct light from the light source 1 and the light reflected by the reflection surface 2a of the parabolic mirror 2 are incident and from which these lights emerge after being split into a plurality of beams of light. The first lenses 4a have identically shaped apertures. The first lens array 4 is located in vicinity of an output side of the IR-UV filter 3 so as to be maximally close to the parabolic mirror 2.

A polarized beam splitter 5 is a splitter of a polarized beam converting optical system in the form of a triangular prism. The splitter 5 splits a plurality of beams of light split by the first lens array 4 into beams 6 of first linearly polarized light components and beams 7 of second linearly polarized light components, the axes of polarization of the first and second linearly polarized light components being normal to each other. A polarized beam splitting surface 5a is formed on a rear surface of the splitter 5 which is a slanted surface of a right-angle prism. The first linearly polarized light components of the light emerging from the first lens array 4 are reflected at 90° by the polarized beam splitting surface 5a after having been incident thereon at 45° and emerge from the splitter 5 as the beams 6. A full-reflection surface 5c is so formed as to face the polarized beam splitting surface 5a at an interval of thickness 5b from the polarized beam splitting surface 5a.

The second linearly polarized light components of the light emerging from the first lens array 4 which are normal to the first linearly polarized light components are reflected at 90° by the full-reflection surface 5c after having been incident on the full-reflection surface 5c at 45° and emerge from the splitter 5 as the beams 7. The thickness 5b is set based on the interval between the beams 6 and 7 ($2^{1/2}$ times the thickness 5b) and the interval between second lenses 8a.

A second lens array 8 constituting the optical integrator includes the second lenses 8a which are arranged in a two-dimensional manner in the vicinity of a position where the plurality of beams 6, 7 split by the polarized beam splitter 5 converge and are as many as the plurality of beams 6 and the plurality of beams 7. Specifically, the second lens array 8 has twice as many as the first lenses 4a of the first lens array 4, and two second lenses 8a adjacent to each other along vertical direction of FIG. 1 correspond to one first lens 4a. On a portion of the emergence surface of the second lens array 8 where the beams 7 emerge, there are mounted half-wave plates 9 for converting the second linearly polarized light components of the beams 7 so as to have the same axis of polarization as the first linearly polarized light components of the beams 6. The half-wave plate 9 is a converting portion of the polarized beam converting optical system and constructs the polarized beam converting optical system together with the aforementioned polarized beam splitter 5.

The optical image forming unit C is a liquid crystal panel of transmission type which includes liquid crystal panels 10, 11, 12 for forming optical images of B, G and R, respectively.

The spectral optical system B includes a dichroic mirror 13, a full-reflection mirror 14, a field lens 15, a dichroic mirror 16, a field lens 17, lenses 18, 19, full-reflection mirrors 20, 21 and a field lens 22.

The two dichroic mirrors 13, 16 construct a color separating optical system for splitting light into beams of three primary colors in order to illuminate the three liquid crystal panels 10 to 12 with the corresponding primary color beams. The dichroic mirror 13 has a cutoff value of wavelength 510 nm so as to reflect the beams in the wavelength region of B and cause the beams in the wavelength regions of R and G to pass (see FIG. 3B). The full-reflection mirror 14 directs the split beams in the wavelength region of B toward the liquid crystal panel 10. The field lens 15 projects the beams in the wavelength region of B reflected by the full-reflection mirror 14 onto the liquid crystal panel 10.

Figure 3A:
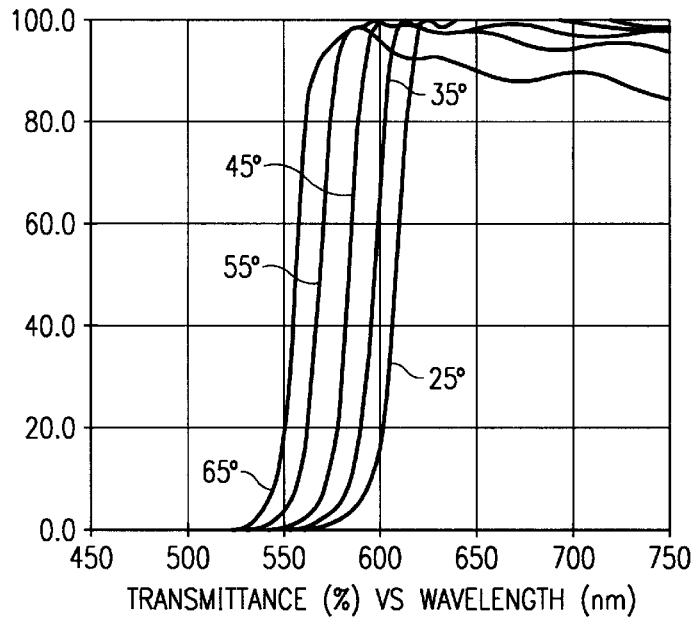
FIGS. 3A and 3B are graphs showing spectral characteristics of a dichroic mirror of long wavelength transmission type.

The dichroic mirror 16 has a cutoff value of wavelength 585 nm so as to reflect the beams in the wavelength region of G among those in the wavelength region of R and G which have passed the dichroic mirror 13 and cause the beams in the wavelength region of R to pass (see FIG. 3A). The field lens 17 projects the beams in the wavelength region of G split by the dichroic mirror 16 onto the liquid crystal panel 11.

The lenses 18, 19 and the full-reflection mirrors 20, 21 construct a relay optical system for introducing the beams in the wavelength region of R which have passed the dichroic mirror 16 to the liquid crystal panel 12 while keeping the illuminance thereof. The field lens 22 projects the beams in the wavelength region of R which have been introduced by the relay optical system onto the liquid crystal panel 12.

Unlike the known projector in which two dichroic mirrors are both short wavelength transmission type or one short wavelength transmission type and one long wavelength transmission type, the dichroic mirrors 13, 16 used in this projector are long wavelength transmission type.

Figure 2A:
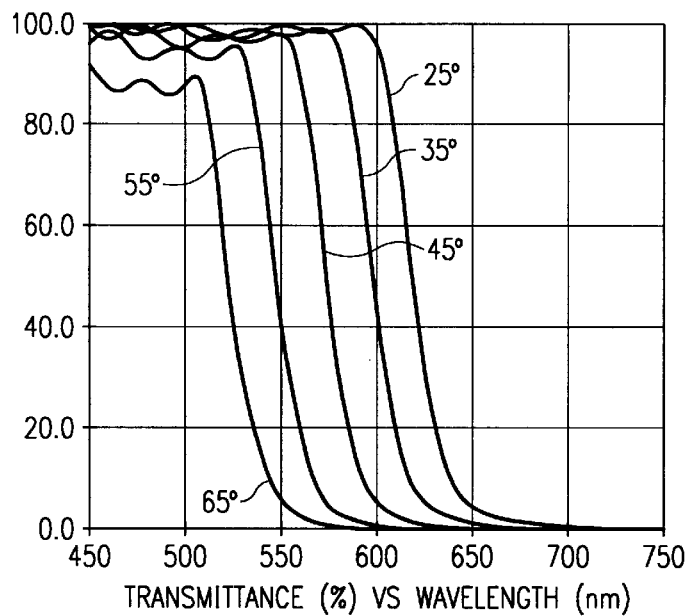
FIGS. 2A and 2B are graphs showing spectral characteristics of a dichroic mirror of short wavelength transmission type.
Figure 2B:
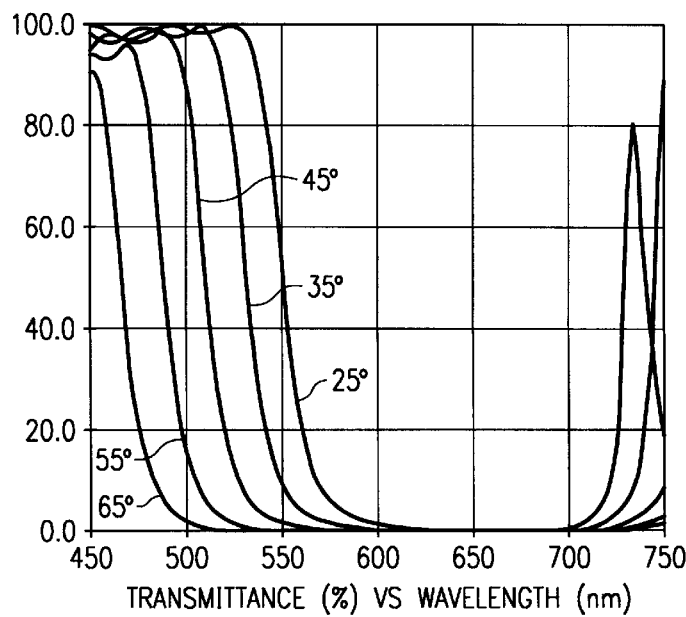
Figure 3B:
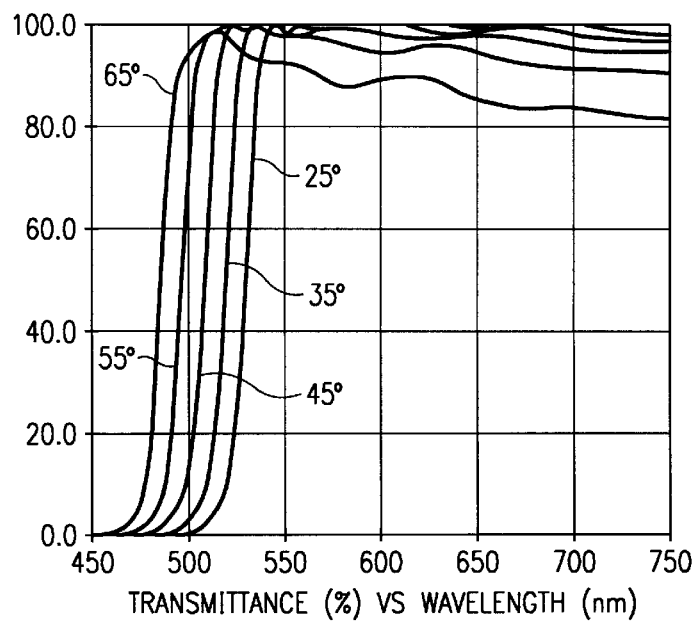

FIGS. 2A and 2B show spectral characteristics of a dichroic mirror of short wavelength transmission type, and FIGS. 3A and 3B show the spectral characteristics of a dichroic mirror of long wavelength transmission type. Comparison of FIGS. 3A and 3B with FIG. 2A and 2B shows that the dichroic mirror of long wavelength transmission type has a smaller shifting range of the cutoff value with respect to a target wavelength (so-called half-wavelength shift).

Specifically, a shifting range of the half-wavelength for every 10° of the dichroic mirror of long wavelength transmission type is about 50 nm. Such a shifting range stands for an improvement of about 47% as compared with the shifting range of the half-wavelength of the dichroic mirror of short wavelength transmission type which is about 95 nm.

Accordingly, a high quality image having its chromaticity nonuniformity considerably reduced can be projected as an enlarged image on a screen. Further, even if the projector uses the optical integrator, it can display as good a performance as the projector which does not use an optical integrator.

The optical image combining/enlarging unit D includes a projection lens 24 as a projecting optical system for projecting an enlarged a color optical image from the dichroic prism 23 on a screen (not shown).

The dichroic prism 23 is a three primary color combining optical system for combining the aforementioned optical images of R, G and B. The dichroic prism 23 in the form of a cube or rectangular parallelepiped includes four right-angle prisms (or roof prisms) 23a joined with each other. In the joined portions of the prisms 23a are formed a first dichroic mirror portion 23b for reflecting the optical image of B at 90° which has been incident thereon at 45° and causing the optical images of R and G to pass, and a second dichroic mirror portion 23c for reflecting the optical image of R at 90° which has been incident thereon at 45° and causing the optical images of G and B to pass. These first and second dichroic mirror portions 23b, 23c are such that different kinds of metals are deposited in a specified order to successively form laminated coatings in order to obtain a specified wavelength for the cutoff value.

Figure 4:
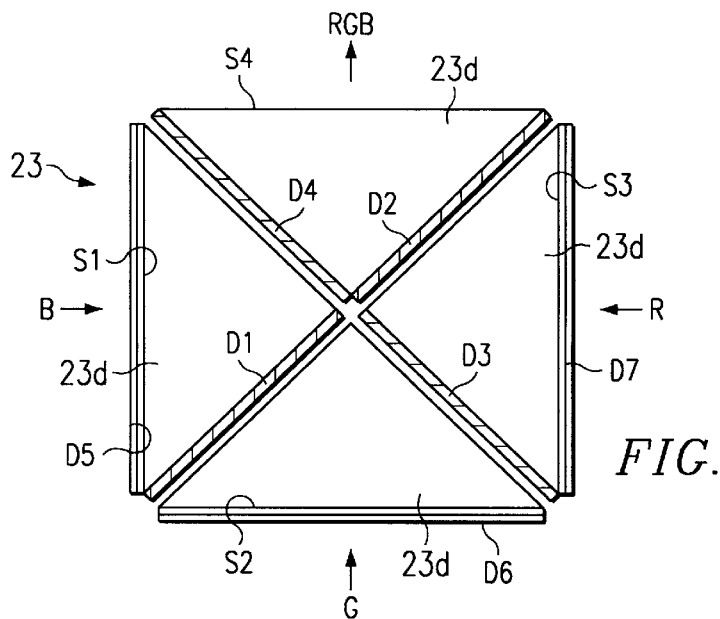
FIG. 4 is an enlarged view showing a construction of a dichroic prism used in the first projector.

The detailed construction of the dichroic prism 23 is described with reference to FIG. 4 which is an enlarged view of the dichroic prism 23. The first dichroic mirror portion 23b shown in FIG. 1 includes dichroic coatings D1, D2 of ten or more layers for reflecting the optical image of B and causing the optical images of R and G to pass. The dichroic coatings D1, D2 are formed as laminated layers on the first and fourth right-angle prisms 23a, respectively. The second dichroic mirror portion 23c includes dichroic coatings D3, D4 of 10 or more layers for reflecting the optical image of R and causing the optical images of G and B to pass. The dichroic coatings D3, D4 are formed as laminated layers on the third and fourth right-angle prisms 23a, respectively.

On all incidence surfaces S1, S2, S3 of the dichroic prism 23, a color correction coating which is a dichroic coating of ten or more layers is formed as a laminated layer in order to remove light components which makes the image unbalanced to cause a color unevenness. Specifically, a color correction coating D5 is formed on the incidence surface S1 of the first right-angle prism 23a; a color correction coating D6 on the incidence surface S2 of the second right-angle prism 23a; and a color correction coating D7 on the incidence surface S3 of the third right-angle prism 23a.

By suppressing the number of the surfaces of each right-angle prism 23a where a coating of ten or more layers is formed to two or smaller, each right-angle prism 23a is placed in a deposition atmosphere for forming a laminated layer coating at most twice. Particularly, the multilayer coating formed during the first deposition is not placed in the deposition atmosphere more than once. This advantageous in preventing the degradation of the right-angle prisms 23a caused by the multilayer coating deposition.

Thus, without increasing the number of parts, unnecessary light components which makes the optical image projected on the screen unbalanced can be removed, and a projector capable of projecting an enlarged high quality optical image can be obtained. Further advantages include an improvement in the reliability of the dichroic prism, a wider selection range of deposition materials, and an improvement of defect rate in the production of the dichroic prisms.

Referring back to FIG. 1, randomly polarized beams irradiated from the light source 1 together with the light reflected by the reflection surface 2a of the parabolic mirror 2 have light components in a wavelength area unnecessary for the three wavelength regions of R, G and B removed by the IR-UV filter 3. The light having light components in the unnecessary wavelength area removed are split into a plurality of beams by the first lens array 4.

The respective beams split by the first lens array 4 are split by the polarized beam splitter 5 into beams 6 of first linearly polarized light components and beams 7 of second linearly polarized light components, the axes of polarization of the beams 6 and 7 being normal to each other. Specifically, the beams emerging from the emergence surface of the first lens array 4 are propagated straight in the polarized beam splitter 5 as incident light. The first linearly polarized light components of the incident light are reflected at 90° by the polarized beam splitting surface 5a after having been incident thereon at 45°, and emerge as the beams 6. Further, the incident light of the second linearly polarized light components which is propagated straight further along an optic path produced by the thickness 5b without being reflected by the polarized beam splitting surface 5a is reflected at 90° by the full-reflection surface 5c after having been incident thereon at 45°, and emerges as the beams 7.

A plurality of beams 6 and a plurality of beams 7 form as many small light sources as the number of beams split by the first lens array 4 in vicinity of the second lens array 8 by the focusing action of the first lens array 4. The half-wave plates 9 are mounted on the emergence surfaces of the second lens 8a where the small light sources formed by the beams 7 out of those formed on the second lens array 8 are positioned. Thus, the axis of polarization of the second linearly polarized light components of the beams 7 is converted into that of the first linearly polarized light components of the beams 6, thereby aligning the axes of polarization of all small light sources.

The beams having their axes of polarization aligned and emerging from the second lens array 8 mounted with the half-wave plates 9 are split into beams in wavelength regions of R, G and B by the dichroic mirrors 13, 16. Specifically, the beams in the wavelength region of B split by the dichroic mirror 13 illuminate the liquid crystal panel 10 after being reflected by the full-reflection mirror 14 and passing the field lens 15. The beams in the wavelength regions of R and G pass the dichroic mirror 13. Then, the beams in the wavelength region of G illuminate the liquid crystal panel 11 after being reflected by the dichroic mirror 16 and passing the field lens 17. The beams in the wavelength region of R pass the field lens 22 after passing the dichroic mirror 16 and being introduced to the relay optical system having the two lenses 18, 19 and the two full-reflection mirrors 20, 21, and consequently illuminate the liquid crystal panel 12. Since a distance between the liquid crystal panel 12 and the second lens array 8 is different from a distance between the second lens array 8 and the liquid crystal panels 10, 11, the illuminated state of the liquid crystal panel 12 is made equal to those of the other liquid crystal panels 10, 11 by using the lenses 18, 19 of the relay optical system.

The optical images formed by the three liquid crystal panels 10 to 12 are combined by the dichroic prism 23. Specifically, the optical image of R formed by the liquid crystal panel 12 has its unnecessary components which makes the optical image of R unbalanced removed by the color correction coating D7 formed on the incident surface S3 of the third right-angle prism 23a. At this stage, the spectral characteristics of the dichroic mirror 16 become the ones shown in FIG. 3A.

In this embodiment, the optical integrator is used. In the case of the range of incidence angle of light on the dichroic mirror 16 being 45°±10°, the dichroic mirror 16 transmits light having a wavelength of 590 nm or more at an incidence angle of 35° while transmitting light having a wavelength of 570 nm or more at an incidence angle of 55°. However, the color correction coating D7 is provided with a property of transmitting light having a wavelength of 590 nm or more. Accordingly, the optical image of R having its unnecessary light components removed is propagated straight in the dichroic prism 23 as an incident light, is reflected at 90° by the second dichroic mirror portion 23b after having been incident thereon at 45°, and emerges toward the projection lens 24.

Similarly, the optical image of B formed on the liquid crystal panel 10 has its unnecessary light components which makes the optical image of B unbalanced removed by the color correction coating D5 formed on the incidence surface S1 of the first right-angle prism 23a. The optical image of B having the unnecessary light components removed is propagated straight in the dichroic prism 23 as incident light, and is reflected at 90° by the first dichroic mirror portion 23b after having been incident thereon at 45°, and emerges toward the projection lens 24.

The optical image of G formed on the liquid crystal panel 11 also has its unnecessary light components which makes the optical image of G unbalanced removed by the color correction coating D6 formed on the incidence surface S2 of the second right-angle prism 23a. The optical image of G having the unnecessary light components removed is propagated straight all through the dichroic prism 23 as incident light without being reflected by the first and second dichroic mirror portions 23b, 23c, and emerges toward the projection lens 24.

The optical images formed by the respective three liquid crystal panels 10 to 12 are combined by being projected toward the projection lens 24 located in the same direction while the axes of polarization of the optical image are coincided with the optic axis. The combined optical image is enlargedly projected on the screen via the projection lens 24.

In this embodiment, instead of the full-reflection mirror 21, a dichroic mirror for reflecting the beams in the wavelength region of R (hereinafter, "R-reflection dichroic mirror") may be used. In FIG. 1, identified by 26 is a beam which is incident on the dichroic mirror 16 at an angle θ1 (wherein θ1<45°). In this case, the half wavelength shifts-toward a long wavelength side (see FIG. 3A). Thereafter, the beam 26 is incident on the R-reflection dichroic mirror at an angle θ2. Since the R-reflection dichroic mirror and the dichroic mirror 16 are so arranged as to be perpendicular to each other, the angle θ2 becomes larger than 45°, and the half wavelength of the R-reflection dichroic mirror shifts toward a short wavelength side. The following relationship or Equation 1 is established between the angle θ1 and the angle θ2.

$$\theta 1-45°=45°-\theta 2 \tag{1}$$

The spectral characteristic of the beam 26 is given as a function of θ1 and θ2. Since the beam 26 is a red light, the spectral characteristic thereof is determined by the angle θ1 which is shifted toward the long wavelength side. This means that the color is determined by the dichroic mirror 16. Equation (1) holds for all red lights reaching the liquid crystal panel 12. The angle θ2 becomes smaller than 45° if the angle θ1 is larger than 45°, and the spectral characteristic of the beam 26 is determined by the angle θ2 which is shifted toward the long wavelength side. This means that the color is determined by the R-reflection dichroic mirror.

Specifically, the spectral characteristic of the red light illuminating the liquid crystal panel 12 is determined by a smaller one of the angle θ1 and the angle θ2. Contrary to; this, if the full-reflection mirror 21 is used, the spectral characteristic of the red light is determined only by the angle θ1. Thus, the use of the R-reflection dichroic mirror the half wavelength of which is shifted by about 40 nm makes the degree of chromaticity variation smaller than the full-reflection mirror the half wavelength of which is shifted by about 50 nm.

Figure 5:
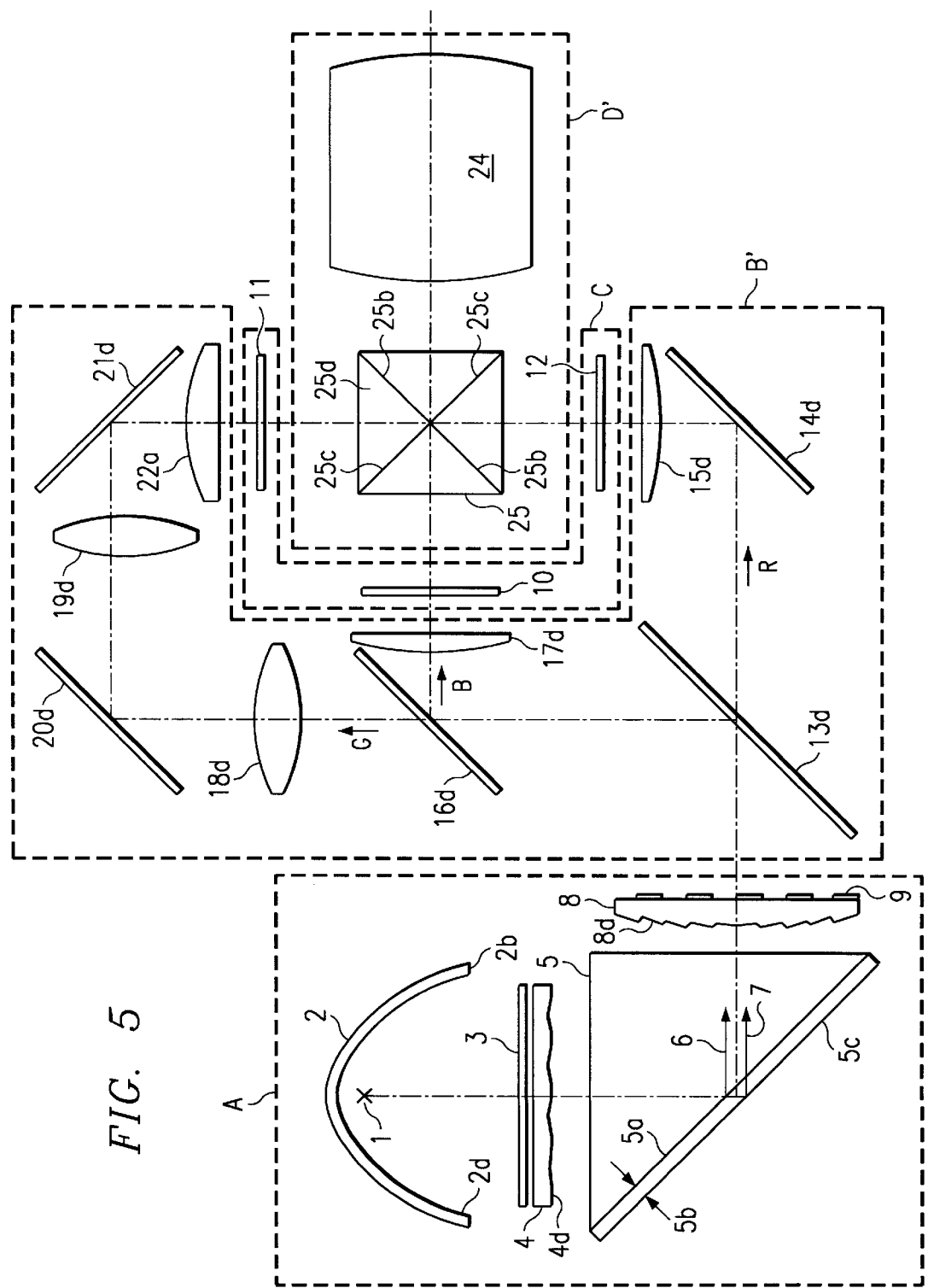
FIG. 5 is a diagram showing a construction of a second projector of the invention.
Figure 8:
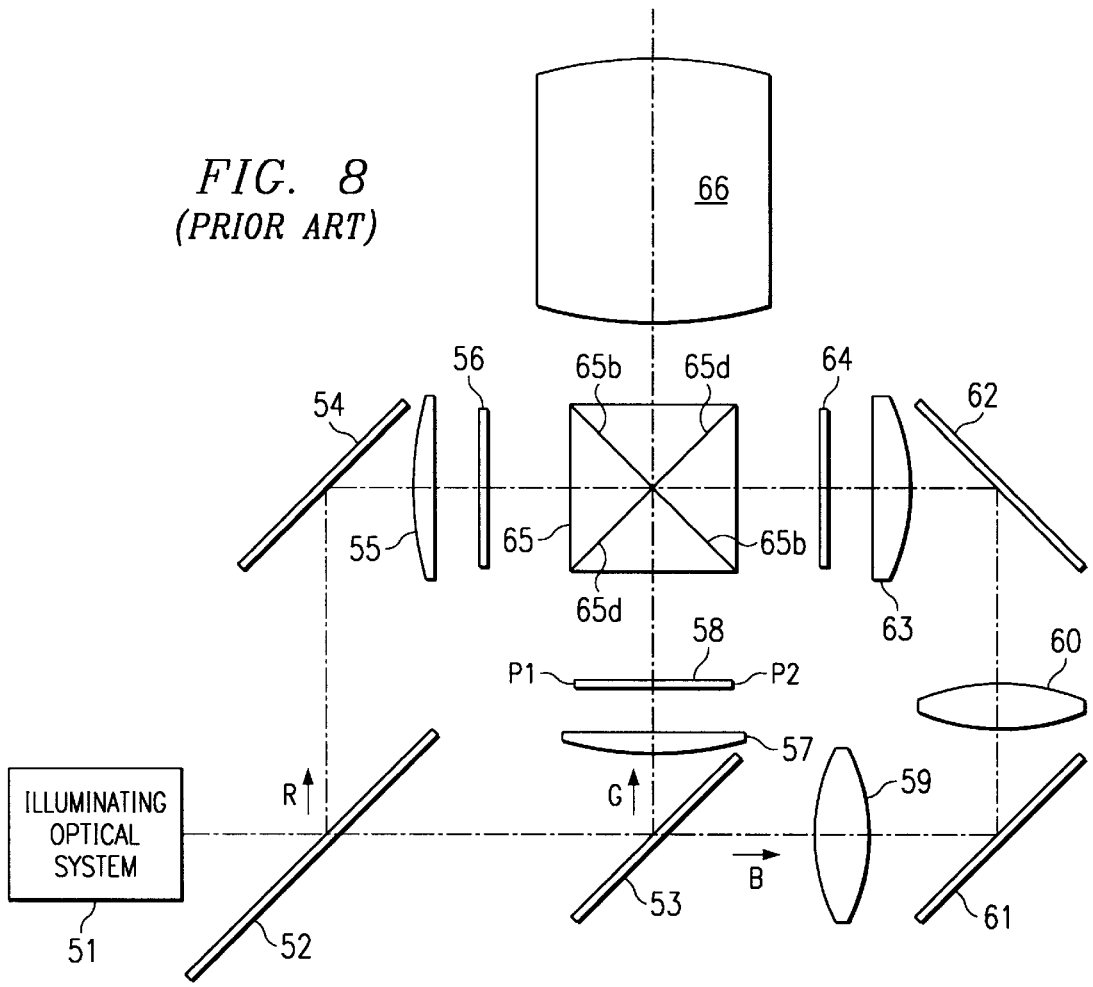
FIG. 8 is a diagram showing a construction of a conventional projector.
Figure 9:
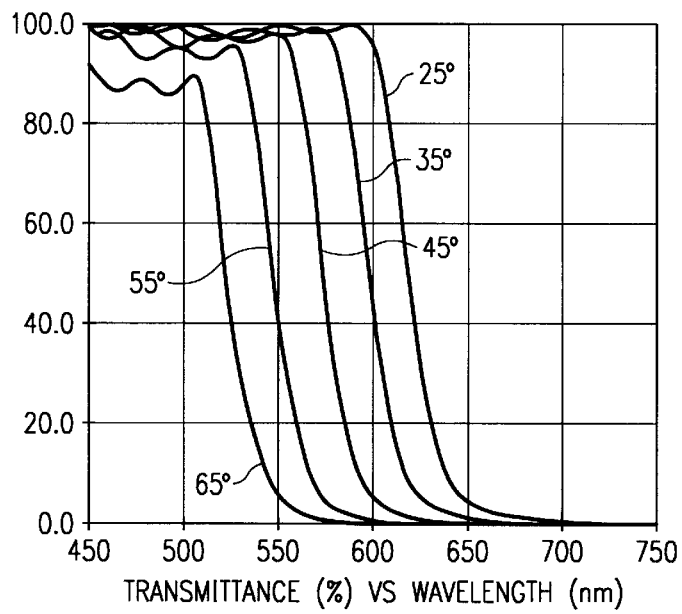
FIG. 9 is a graph showing spectral characteristics of a dichroic mirror of the conventional projector.
Figure 10:
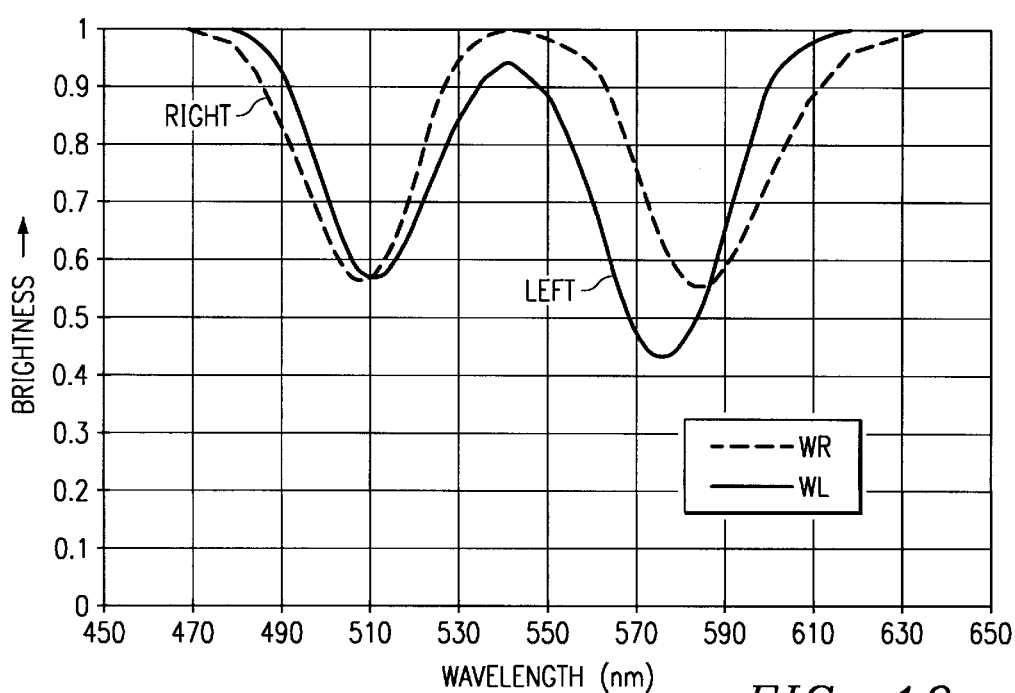
FIG. 10 is a graph showing spectral distributions at the left and right sides of a projected image obtained by the conventional projector.

Next, a second embodiment of the invention will be described with reference to FIG. 5. The second projector has a construction basically identical to that of the first projector.

Accordingly, only different portions of the second projector will be described later. The same elements are identified by the same reference numerals.

A spectral optical system B' of the second projector includes a dichroic mirror 13a, a full-reflection mirror 14a, a field lens 15a, a dichroic mirror 16a, a field lens 17a, lenses 18a, 19a, full-reflection mirrors 20a, 21a, and a field lens 22a.

The two dichroic mirrors 13a, 16a constitute a color separating optical system for separating light into beams of three primary colors for illuminating three liquid crystal panels 10 to 12. Similar to the first projector, the dichroic mirrors 13a, 16a used are of long wavelength transmission type. Specifically, the dichroic mirror 13a has a cutoff value of wavelength 585 nm so as to reflect the beams in the wavelength regions of G and B and cause the beams in the wavelength region of R to pass (see FIG. 3A). The full-reflection mirror 14a directs the split beams in the wavelength region of R toward the liquid crystal panel 12. The field lens 15a projects the beams of the wavelength region of R reflected by the full-reflection mirror 14a to the liquid crystal panel 12.

The dichroic mirror 16a has a cutoff value of wavelength 510 nm so as to reflect the beams in the wavelength region of B among the beams in the wavelength regions of G and B reflected by the dichroic mirror 13a and cause the beams in the wavelength region of G to pass. The field lens 17a projects the beams in the wavelength region of B split by the dichroic mirror 16a to the liquid crystal panel 10. The lenses 18a, 19a and the full-reflection mirrors 20a, 21a constitute a relay optical system for introducing the beams in the wavelength region of G having passed the dichroic mirror 16a to the liquid crystal panel 11 while keeping their illuminance. The field lens 22a projects the beams in the wavelength region of G introduced by the relay optical system to the liquid crystal panel 11.

An optical image combining/enlarging unit D' of the second projector includes a dichroic prism 25 and a projection lens 24. The dichroic prism 25 is a three primary color combining optical system for combining the respective optical images of R, G and B. The dichroic prism 25 includes four right-angle prisms 25a which are joined to have a cubic or rectangular parallelepipedic shape. In the joined portions are formed a first dichroic mirror portion 25b for reflecting the optical image of R at 90° which has been incident thereon at 45° and causing the optical images of G and B to pass, and a second dichroic mirror portion 25c for reflecting the optical image of B at 90° which has been incident thereon at 45° and causing the optical image of B to pass. It should be noted that dichroic coatings for the color correction may be formed such that the number of the surfaces of each right-angle prism 25a where a laminated layer is formed is two or less as in the first embodiment.

The beams having their axes of polarization aligned and emerging from the illuminating optical system A are split into beams in the three wavelength regions of R, G, B by the dichroic mirrors 13a, 16a. Specifically, the beams in the wavelength region of R having passed the dichroic mirror 13a illuminate the liquid crystal panel 12 after being reflected by the full-reflection mirror 14a and passing the field lens 15a. The beams in the wavelength regions of G and B are reflected by the dichroic mirror 13a. The beams in the wavelength region of B illuminate the liquid crystal panel 10 after being reflected by the dichroic mirror 16a and passing the field lens 17a. The beams in the wavelength region of G pass the field lens 22a and illuminate the liquid crystal panel 11 after passing the dichroic mirror 16a and being introduced to the relay optical system including the two lenses 18a, 19a and the two full-reflection mirrors 20a, 21a.

The optical images formed by the three liquid crystal panels 10 to 12 are combined by the dichroic prism 25. Specifically, the optical image of R formed by the liquid crystal panel 12 is propagated straight in the dichroic prism 25 as incident light, and is reflected at 90° by the first dichroic mirror portion 25b after having been incident thereon at 45° and emerges toward the projection lens 24. The optical image of G formed by the liquid crystal panel 11 also is propagated straight in the dichroic prism 25 as an incident light, is reflected at 90° by the second dichroic mirror portion 25c after having been incident thereon at 45°, and emerges toward the projection lens 24. The optical image of B formed by the liquid crystal panel 10 is propagated straight all through the dichroic prism 25 as an incident light without being reflected by the first and second dichroic mirror portions 25b, 25c, and emerges toward the projection lens 24.

In this embodiment, instead of the full-reflection mirror 21a, a dichroic mirror for reflecting the beams in the wavelength region of G (hereinafter, "G-reflection dichroic mirror) may be used. In such a case, the G-reflection dichroic mirror can be realized by the identically designed thin film as the dichroic mirror 13a for causing the beams in the wavelength region of R to pass. Thus, the use of the G-reflection dichroic mirror the half wavelength of which is shifted by about 25 nm can reduce the degree of chromaticity variation to the half as compared with the full-reflection mirror the half wavelength of which is shifted by about 50 nm. In order to determine a limit at the long wavelength side of green light, the dichroic mirror 13a for passing the beams in the ,wavelength region of R and the G-reflection dichroic mirror are combined. However, a limit at the long wavelength side of green light can be determined by combining the dichroic mirror 16a for reflecting the beams in the wavelength region of B and the G-reflection dichroic mirror.

According to the invention, it may be appreciated to use a lens having a large aperture size with an F-number equal to or smaller than 3 as the projection lens 24 of the first and second projectors. Specifically, the use of a projection lens having F=3 suppresses the color unevenness on the screen on which an image is projected by the inventive projector using the optical integrator substantially to that obtained by the conventional projector using no optical integrator.

The F-number of the projecting optical system needs to be brighter than the F-number of the illuminating optical system. Otherwise, not all beams from the illuminating optical system A cannot be taken by the projection optical system, causing a light loss.

Generally, the light emerged from the illuminating optical system in which the optical integrator is not used is a substantially parallel light having a variation range of ±2.5°. In this case, since the F-number of the illuminating optical system is about F=12 (variation of incidence angle θ1±2.4°) and F-number of the projection optical system is about F=5 (variation of incidence angle θ2±5.7°), the F-number of the projecting optical system is brighter than the F-number of the illuminating optical system. Thus, there is no light loss. At this time, since the beams incident on the dichroic mirror are incident beams by a substantially telecentric system, the angle θ1 can be ignored. Accordingly, a variation of incidence angle at the dichroic mirror portions of the dichroic prism is in the range of about 45±5.7°. In the description below, it is assumed that the above-mentioned variation of incidence angle in the illuminating optical system in which the optical integrator is used generally falls within a range of 45±7°.

Contrary to this, in the projector in which the optical integrator is used and the projection lens 24 has the F-number of 3, the illumination light emerged from the second lens array 8 is not an illumination light by the telecentric system. Accordingly, the variation of incidence angle at the first and second dichroic mirrors 13, 16 of FIG. 1 is larger than the variation of incidence angle of the conventional projector in which the optical integrator is not used. Thus, the angle θ1 cannot be ignored as described above. However, in order to suppress the color unevenness substantially to that of the conventional projector in which the optical integrator is not used, the variation of incidence angle at the first and second dichroic mirror portions 23*b*, 23*c* may be suppressed within a range of 45±14° by the spectral characteristics of the dichroic mirrors 13, 16 (compare FIGS. 2 and 3). In other words, as is seen from the comparison of FIGS. 2 and 3, a shift sensitivity of the dichroic mirror of long wavelength transmission type to the variation of incidence angle is smaller than that of the dichroic mirror of short wavelength transmission type. Thus, in the projector using the dichroic mirror of long wavelength transmission type, if the variation of incidence angle is suppressed to a range of 45±14°, color unevenness can be suppressed to the same degree as the case where the variation is suppressed to a range of 45±7° if the dichroic mirror of short wavelength transmission type is used.

Since it is difficult as described above to suppress the variation of incidence angle to a smaller degree when the optical integrator is used, it is very difficult to suppress the variation of incidence angle to 45±7° similarly as in the case where the optical integrator is not used. Accordingly, when the dichroic mirror of short wavelength transmittance type is used, it is difficult to sufficiently effectively prevent color unevenness. However, if all dichroic mirrors are of long wavelength transmission type, the color unevenness can be suppressed to the same degree as in the case where the optical integrator is not used even if the variation of incidence angle is permitted to 45±14°.

Figure 6:
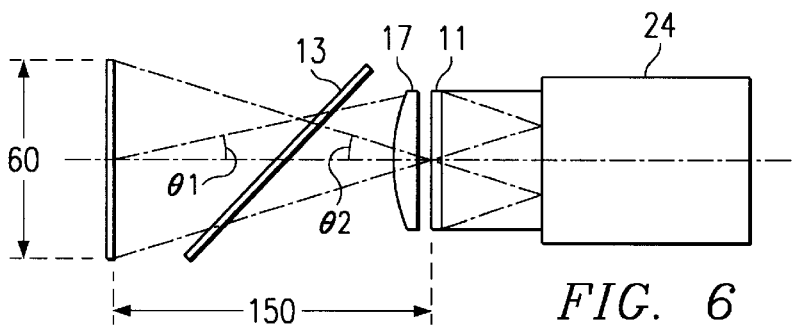
FIG. 6 is a diagram showing calculation of a variation in incidence angle on a first or second dichroic mirror portion.

FIG. 6 explains how the variation of incidence angle at the first or second dichroic mirror portion 23*b* or 23*c* is obtained. Rectangular liquid crystal panels having a diagonal dimension of 1 inch are used as liquid crystal panels 10, 11, 12. A ratio of dimensions of a display surface of each liquid crystal panel is shorter side: longer side: diagonal line=3:4:5. The angle θ1 obtained in this manner is 5° ($\approx\tan^{-1}\{(26.416/2)/150\}$). Thus, the variation θ2 of incidence angle by the projection lens 24 needs to be smaller than 9° (<14–5). Accordingly, if the F-number of the projection lens 24 is 3, it is desirable to set the F-number of the illuminating optical system at 3 in view of an easy design and optimal efficiency.

Figure 7:
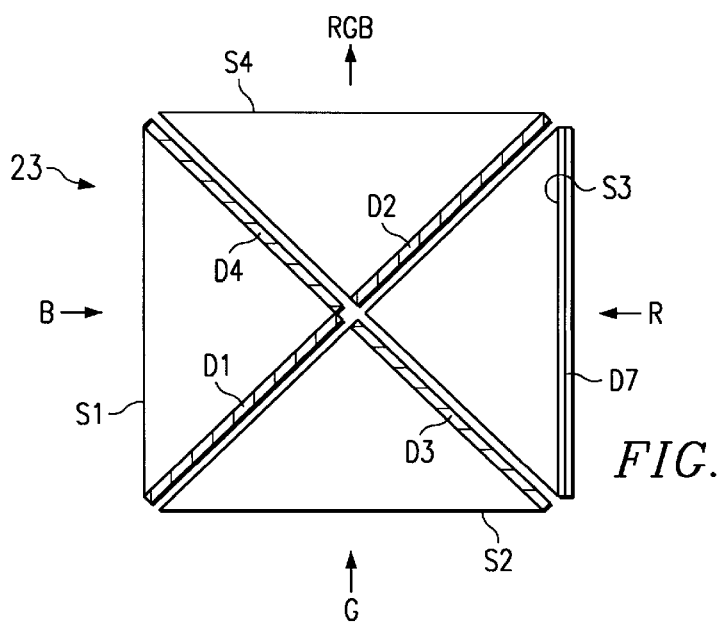
FIG. 7 is an enlarged view showing a construction of another dichroic prism.

Next, another dichroic prism will be described with reference to FIG. 1 and FIG. 7. The first dichroic mirror portion 23*b* includes dichroic coatings D1, D2 of ten or more layers for reflecting the optical image of B and causing the optical images of R and G to pass. The dichroic coatings D1, D2 are formed as laminated layers on the first and fourth right-angle prisms 23*a*, respectively. The second dichroic mirror portion 23*c* includes dichroic coatings D3, D4 of ten or more layers for reflecting the optical image of R and causing the optical images of G and B to pass. The dichroic coatings D3, D4 are formed as laminated layers on the second and first right-angle prisms 23*a*, respectively. A color correction coating D7 which is a dichroic coating of ten or more layers for removing light components causing color unevenness is formed on the incidence surface S3 of the dichroic prism 23. AR (anti-reflection) coatings are applied to the incidence surfaces S1, S2 and the emergence surface S4 of the dichroic prism 23.

The optical images formed by the respective three liquid crystal panels 10 to 12 are combined by the dichroic prism 23. The optical image of B formed by the liquid crystal panel 10 is propagated straight in the dichroic prism 23 as incident light, and is reflected at 90° by the first dichroic mirror portion 23*b* after having been incident thereon at 45°, and emerges toward the projection lens 24. Further, the optical image of R formed by the liquid crystal panel 12 has unnecessary light components which makes the optical image of R unbalanced removed by the color correction coating D7 formed on the incidence surface S3 of the third right-angle prism 23*a*. The optical image of R having its unnecessary light components removed is propagated straight in the dichroic prism 23 as incident light, and is reflected at 90° by the second dichroic mirror portion 23*c* after having been incident thereon at 45°, and emerges toward the projection lens 24. Furthermore, the optical image of G having the unnecessary light components removed is propagated straight all through the dichroic prism 23 as incident light without being reflected by the first and second dichroic mirror portions 23*b*, 23*c*, and emerges toward the projection lens 24.

In the foregoing embodiments, the half-wave plates 9 are arranged all the portions of the emergence surface of the second lens array 8 where the beams 7 emerge. However, it may be appreciated to arrange half-wave plates on a part of an emergence surface of a second lens array where beams emerge.

Further, the half-wave plates 9 are mounted on the emergence surfaces of the second lenses 8*a* where the small light sources formed by the beams 7 are positioned in this embodiment in the foregoing embodiments. However, half-wave plates may be mounted on emergence surfaces of second lenses where small light sources formed by beams are positioned. It is sufficient that half-wave plates be mounted on all or a part of second lenses where small light sources formed by beams are positioned.

Furthermore, a metal halide lamp is used as the light source 1 in the foregoing embodiments. According to the present invention, it may be possible to use a xenon lamp or halogen lamp.

Moreover, in the foregoing embodiments, the liquid crystal panels 10, 11, 12 are used as image panels. According to the present invention, however, it may be possible to use other image panels than a liquid crystal panel.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A projector comprising:
    an illuminating optical system which produces illumination light;
    a spectral optical system which splits the illumination light into bears of three primary colors;
    an optical image forming unit which forms respective optical images of the three primary colors; and
    an optical image combining unit which combines the respective optical images of the three primary colors to produce a color optical image, the optical image combining unit including first to fourth prisms each having three plane surfaces, and being joined into one body in the form of a rectangular parallelepiped, the first to third prisms having incidence surfaces for the beams of the three primary colors, respectively, the fourth prism having an emergence surface for the beams of the three primary colors, one inner plane surface of the first prism and one inner plane surface of the second prism being provided with dichroic mirror layers respectively, and at least one of the first to third prisms being provided with a color correction layer formed on its incidence surface.

2. A projector according to claim 1, wherein the optical image forming unit includes a liquid crystal panel.

3. A projector in accordance with claim 1, wherein the color correction layer is formed in the incidence surface.

4. A projector comprising:
an illuminating optical system which produces illumination light;
a spectral optical system which splits the illumination light into beams of three primary colors;
an optical image forming unit which forms respective optical images of the three primary colors; and
an optical image combining unit which combines the respective optical images of the three primary colors to produce a color optical image, the optical image combining unit including first to fourth prisms each having three plane surfaces, and being joined into one body in the form of a rectangular parallelepiped, the first to third prisms having incidence surfaces for the beams of the three primary colors, respectively, the fourth prism having an emergence surface for the beams of the three primary colors, one inner plane surface of the first prism and one inner plane surface of: the second prism being provided with dichroic mirror layers respectively, and at least one of the first to third prisms being provided with a color correction layer on its incidence surface,
the respective incidence surfaces of the first to third prisms are provided with color correction layers, respectively; and
both inner plane surfaces of the fourth prism are provided with dichroic mirror layers, respectively.

5. A projector comprising:
an illuminating optical system which produces illumination light;
a spectral optical system which splits the illumination light into beams of three primary colors;
an optical image forming unit which forms respective optical images of the three primary colors; and
an optical image combining unit which combines the respective optical images of the three primary colors to produce a color optical image, the optical image combining unit including first to fourth prisms each having three plane surfaces, and being joined into one body in the form of a rectangular parallelepiped, the first to third prisms having incidence surfaces for the beams of the three primary colors respectively, the fourth prism having an emergence surface for the beams of the three primary colors, one inner plane surface of the first prism and one inner plane surface of the second prism being provided with dichroic mirror layers respectively, and at least one of the first to third prisms being provided with a color correction layer on its incidence surface,
an incidence surface of the third prism is provided with a color correction layer;

the other inner surface of one of the first and second prisms is further provided with a dichroic mirror layer; and
one inner surface of the fourth prism is provided with a dichroic mirror layer.

6. An optical device comprising:
a prism assembly including four right-angle prisms joined at their respective right angles to combine light beams;
a first type of multilayer coating being provided between joining surfaces of the four right-angle prisms; and
a second type of multilayer coating being provided on at least one non-joining surface of the four right-angle prisms;
each prism bearing the first type of multilayer coating and the second type of multilayer coating on two or less surfaces thereof.

7. An optical device according to claim 6, wherein the first type of multilayer coating is operable as a dichroic mirror, and the second type of multilayer coating is operable as a color correction.

8. An optical device according to claim 6, further comprising liquid crystal image panels on which optical images of three primary colors are respectively formed, wherein the prism assembly is operable to combine optical images and project a combined optical image.

9. An optical device comprising:
a prism assembly including four roof prisms joined to their respective roofs to combine light beams;
a first type of multilayer coating being provided between joining surfaces of the four roof prisms; and
a second type of multilayer coating being provided on at least one non-joining surface of the four roof prisms;
each prism bearing the first type of multilayer coating and the second type of multilayer coating on two or less surfaces thereof.

10. An optical device according to claim 9, wherein the first type of multilayer coating is operable as a dichroic mirror, and the second type of multilayer coating is operable as a color correction.

11. An optical device according to claim 9, further comprising liquid crystal image panels on which optical images of three primary colors are respectively formed, wherein the prism assembly is operable to combine optical images and project a combined optical image.

12. A projector comprising:
an illuminating optical system which produces illumination light;
a spectral optical system which splits the illumination light into beams of the three primary colors, the spectral optical system including a first dichroic mirror operable to reflect beams of blue and pass beams of green and red, and a second dichroic mirror disposed in a propagation direction of illumination light and operable to reflect beams of green and pass beams of red;
an optical image forming unit which forms respective optical images of the three primary colors;
an optical image combining unit which combines the respective optical images of the three primary colors to produce a color optical image; and
an image projection lens having an F-number equal to or less than three for projecting a produced color optical image.

* * * * *